(No Model.)
J. N. MICHAELS & D. H. & J. GITTINGER.
ROAD SCRAPER AND LEVELER.
No. 579,404. Patented Mar. 23, 1897.
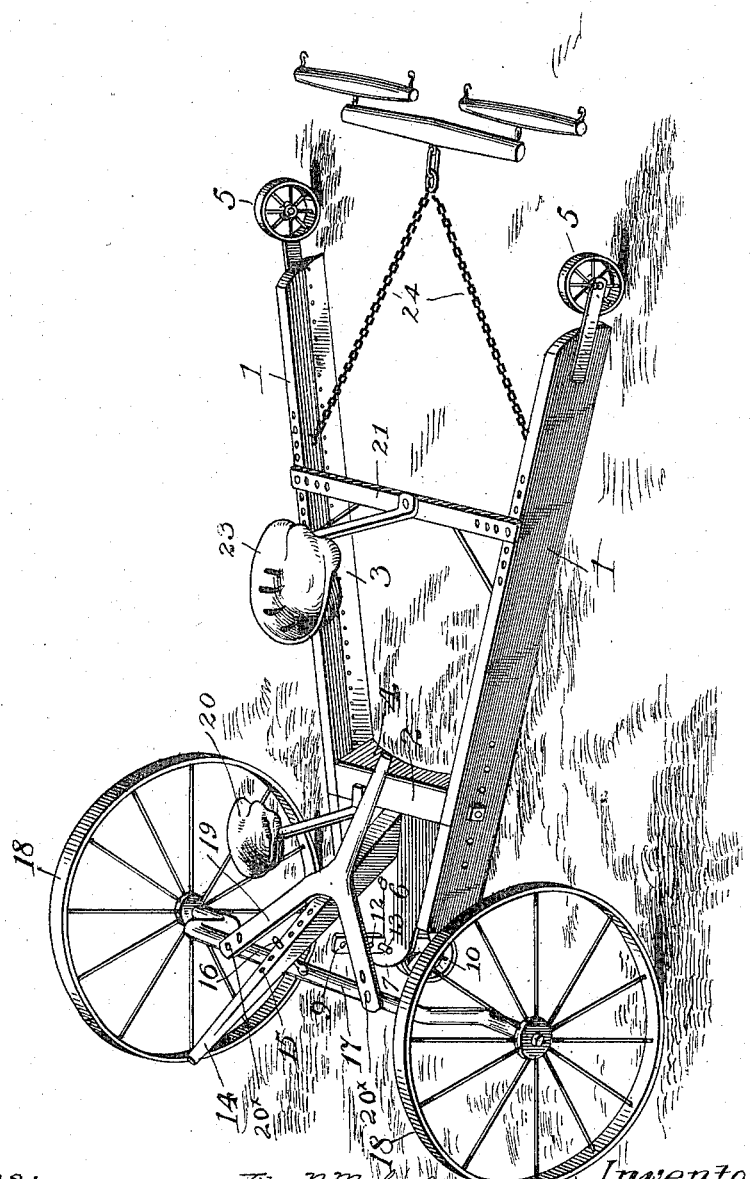

UNITED STATES PATENT OFFICE.

JOHN N. MICHAELS, OF UNION CITY, OHIO, AND DANIEL H. GITTINGER AND JONAS GITTINGER, OF UNION CITY, INDIANA.

ROAD SCRAPER AND LEVELER.

SPECIFICATION forming part of Letters Patent No. 579,404, dated March 23, 1897.

Application filed June 2, 1896. Serial No. 593,990. (No model.)

*To all whom it may concern:*

Be it known that we, JOHN N. MICHAELS, residing at Union City, in the county of Darke and State of Ohio, and DANIEL H. GITTINGER and JONAS GITTINGER, residing at Union City, in the county of Randolph and State of Indiana, citizens of the United States, have invented certain new and useful Improvements in Road Scrapers and Levelers; and we do hereby declare the following to be a full, clear, and exact description of the invention, such as will enable others skilled in the art to which it appertains to make and use the same.

Our invention relates to improvements in road-scrapers for filling up depressions and leveling dirt roads; and its object is to provide an improved construction of the same whereby we secure important advantages with respect to efficiency in operation.

The invention consists in the novel construction and combination of parts hereinafter fully described and claimed.

In the drawing the figure is a perspective view of a road-scraper constructed in accordance with our invention.

In the said drawing the reference-numeral 1 designates two inclined boards converging toward their rear ends and secured to a longitudinally-adjustable block 2, the opposite sides of which are beveled at an angle. The inner sides of these boards 1 are provided with scrapers or blades 3, and the front end of the block 2 is provided with a scraper or blade 4, the ends of which meet or abut against the scrapers 3. At the front ends of the boards are provided the wheels 5. Fastened to the upper side of the block 2 is a plate 6, to the rear end of which is secured or formed a bracket or extension 7, having a slot 8, through which passes a standard 9, provided at its lower end with a wheel 10. This standard is formed with a number of holes 12, through which passes two pins 13, (the lower one not being shown,) by means of which the standards may be vertically adjusted to raise or lower the inner end of the scraper. Secured to the plate 6 is a rearwardly and upwardly extending arm 14, having a number of holes 15, through one of which passes a pin 16, formed or connected with an arched axle 17, provided at the end with wheels 18. This arm can be adjusted, by means of the holes 15 and pin 16, to adjust the scrapers to any depth desired. A bifurcated lever 19 is connected at $20^\times$ to the axle and can be moved to lift the axle and raise the scrapers at the rear and throw them out of use. A seat 20 is located on the plate 6, on which a person sits to hold the end of the scraper from movement.

Removably connected to the boards 1 is a cross-bar 21, on which is mounted a driver's seat 23. This cross-bar serves to connect the boards 1 together, and to said boards are secured chains 24, which in turn are connected with a whiffletree attached to the harness of draft-animals or to a traction-engine. The block 2 is adjustable, or may be moved forward and backward, by loosening the nuts and removing the bolts which connect it with the boards 1, so as to vary the width of the scrapers, and the cross-bar carrying the driver's seat is removable to allow of such adjustment.

The arm 14 and lever 19 can be connected with the rear axle and wheels of an ordinary frame wagon instead of the arched axle, as shown, if desired, thereby obviating the necessity of providing an axle and wheels for each machine.

A scraper constructed as above will be found very efficient in use, as it can be readily raised and lowered to accommodate it to requirement, can be easily guided, and by adjusting the block 2 the front ends of the scrapers can be brought nearer to or farther from each other, thus regulating the width to increase or decrease the width of the cut. The draft also will always be in the center of the machine.

Having fully described our invention, what we claim is—

1. In a road-scraper, the combination with the converging boards provided with scrapers, the block adjustably connected with the rear ends of said boards, provided with a scraper, the adjustable wheel at the rear thereof, the removable cross-bar provided with a driver's seat, and the adjustable front wheels, of the rearwardly and upwardly extending arm adapted to be secured to an axle and the bifurcated lever connected with the axle.

2. In a road-scraper, the combination with the converging boards, the scrapers secured thereto, the removable cross-piece provided with a driver's seat, the front wheels, the adjustable block secured to the rear ends of said board, the scraper secured thereto, the plate secured to said block, the bracket, the adjustable standard and the small wheel, of the seat secured to said plate, the upwardly and rearwardly extending arm secured to said plate, the axle adjustably connected therewith, the wheels, and the bifurcated lever connected with the axle.

In testimony whereof we affix our signatures in presence of two witnesses.

JOHN N. MICHAELS.
DANIEL H. GITTINGER.
JONAS GITTINGER.

Witnesses:
GEO. WELLS SMITH,
LORENZO D. LAMBERT.